United States Patent

Hartmann

[15] 3,684,837

[45] Aug. 15, 1972

[54] METHOD FOR THE SYNCHRONIZATION OF OSCILLATORS PERTAINING TO AT LEAST TWO LONG DISTANCE COMMUNICATION NETWORK SYSTEMS

[72] Inventor: Lothar Hartmann, Boschetsriederstrasse 121, 8000 Munich 25, Germany

[22] Filed: May 21, 1969

[21] Appl. No.: 826,545

[30] Foreign Application Priority Data

May 29, 1968 Germany..........P 17 66 477.6

[52] U.S. Cl...........................179/15 BS, 178/69.5 R

[51] Int. Cl...........................................H04j 3/06

[58] Field of Search...............178/69.5 R; 179/15 BS

[56] References Cited

UNITED STATES PATENTS 3,483,330 12/1969 Inose......................179/15 BS

*Primary Examiner*—Ralph D. Blakeslee

*Attorney*—Birch, Swinder, McKie & Beckett

[57] ABSTRACT

A method for the synchronization of oscillators pertaining to at least two long distance communication network systems, the oscillators of each long distance communication network system being reciprocally synchronized within, the long distance communication network systems having exchange systems operating in multiplex manner according to a scanning pattern.

At least one oscillator of one of the at least two long distance communication network systems is synchronized by at least one oscillator of at least one other of the at least two long distance communication network systems.

2 Claims, 3 Drawing Figures

METHOD FOR THE SYNCHRONIZATION OF OSCILLATORS PERTAINING TO AT LEAST TWO LONG DISTANCE COMMUNICATION NETWORK SYSTEMS

CROSS REFERENCE TO RELATED APPLICATION

Applicants claim priority from corresponding German application Ser. No. P 17 66 477.6 filed May 29, 1968.

BACKGROUND OF THE INVENTION

1. Field of the Invention:

The invention relates to a method for synchronizing oscillators pertaining to at least two long distance communication network systems. It has particular utility in telephone exchange installations operating according to the multiplex principle.

2. Description of the Prior Art:

Telephone exchange installations operating according to the multiplex principle are known. The message signals emitted by a plurality of subscriber stations or message transmitters are transmitted over an individual line or signal route in different time or frequency slots. For each of the message signals emitted by a subscriber station or message transmitter, There is thus available in a time multiplex exchange system a time channel with a series of time slots appearing in cyclic repetition.

Because of the physical properties of switching elements employed in an exchange installation and the limited traffic load of an exchange installation when a plurality of message connections are required at the same time, it is known to combine a certain number of subscriber stations or message transmitters and message receivers in exchange stations. Ordinarily in each exchange station an individual oscillator is used which emits in the exchange station in question control pulses designating transmission channels to be used for a signal transmission. These control pulses are normally known as synchronizing pulses.

In order to make a message exchange possible between subscriber stations or message transmitters and message receivers connected at different exchange stations of a long distance communication network system, it is required that a subscriber station connected to one exchange station during message exchange with a subscriber station connected to another exchange station remain connected with the latter subscriber station. This necessitates that the repetition period of the synchronizing pulses appearing during the individual time slots of a time channel remain the same. This means, however, that in the entire long distance communication network system a certain network frequency which is equal in exchange station must be used. Network frequency is herein defined as that frequency with which the synchronizing pulses, in a given case modulated with message signals, appear in the exchange station in each case.

To solve the above stated problems, one can synchronize the oscillators provided in all exchange stations of a long distance communication network system by a main oscillator arranged at a central location. Another solution resides in the reciprocal synchronization of the oscillators provided in the individual exchange stations of a time multiplex long distance communication network system.

If a long distance communication network system comprises a relatively large number of exchange stations of the above type, relatively complex technical problems and corresponding expense result in view of the desired relatively slight deviation of the frequency of the oscillators provided in the individual exchange stations from the mean network frequency. If, for economical reasons, one would now synchronize with an oscillator contained in an exchange station the oscillators contained in the remaining exchange stations (which would correspond to a synchronization according to the master-slave principle), it would be sufficient to utilize an oscillator having a relatively slight frequency fluctuation range as the oscillator contained in the master-exchange station only. However, this type of synchronization has the decisive disadvantage that in case of failure of the synchronization taking place from the master-exchange station (for example due to disturbance on the line) or the failure of this exchange station, the synchronization of the remaining exchange stations (slave exchange stations) will be considerably disturbed, so that it may become impossible to conduct message traffic between the individual exchange stations.

SUMMARY OF THE INVENTION

The purpose of the invention is to show how oscillators pertaining to long distance communication network systems, which in each case determine a time or frequency scanning pattern for exchange systems provided in the long distance communication network that operate according to the time or frequency multiplex principle, can be synchronized at relatively low circuit-technical cost, even when an oscillator of such a long distance communication network system has failed. This task is solved by the method according to the invention for the synchronization of oscillators pertaining to at least two long distance communication network systems. The oscillators are reciprocally synchronized and determine for the exchange systems, operating according to the time or frequency multiplex principle, a time or frequency scanning pattern.

According to the invention, this method is characterized by the fact that at least one oscillator of one long distance communication network system additionally synchronizes at least one oscillator of at least one other long distance communication network system. This results in the advantage that a relatively small number of connections between the individual long distance communication network systems is sufficient in order to maintain synchronization in the entire network system, even in the event of failure of an oscillator of one of the long distance communication network systems.

In the method according to the invention, in the case of long distance communication network systems with oscillators having approximately equal frequency fluctuation ranges, at least two oscillators pertaining to different long distance communication network systems are reciprocally synchronized. This provides the advantage that synchronization of the oscillators contained in the entire network system is always maintained, practically uninfluenced by disturbances or failures of individual oscillators.

According to a further development of the method according to the invention, in the case of long distance communication network systems with oscillators of which the oscillators contained in a given long distance communication network system have approximately equal frequency fluctuation ranges while the oscillators contained in other long distance communication network systems have different frequency fluctuation ranges, the oscillator of at least one of the long distance communication network systems is synchronized by an oscillator of another of the long distance communication network systems. The oscillators of the latter have a frequency fluctuation range which is narrower than that of the oscillators of the given long distance communication network system.

Thereby, a relatively small number of oscillators having very high frequency stability is sufficient for synchronization of the remaining oscillators. Further, even in case of failure of one of the oscillators having a very high frequency stability or of an exchange station containing such an oscillator, synchronization is still possible by other oscillators having very high frequency stability. Thus the method according to the invention provides synchronization corresponding to the master-slave principle; however, the disadvantages ordinarily inherent in such a synchronization principle are eliminated.

Especially advantageous conditions result in the synchronization if, according to a still further development of the invention, the oscillator of at least one long distance communication network system is synchronized by the oscillator of at least one other long distance communication network system, the latter having an oscillator frequency fluctuation range that is narrower than the frequency range of forced oscillation, $f_{res} \approx (n_E/N^2 \lambda E$, of the oscillators contained in the first-mentioned long distance communication network system. In this regard, $n_E$ is the number of connections of oscillators of the second-mentioned long distance communication network system to oscillators of the first-mentioned long distance communication network system; N is the number of oscillators contained in the first-mentioned long distance communication network system; and $\lambda E$ is the control range of the last-mentioned oscillators.

DETAILED DESCRIPTION OF THE INVENTION

Figure 1:
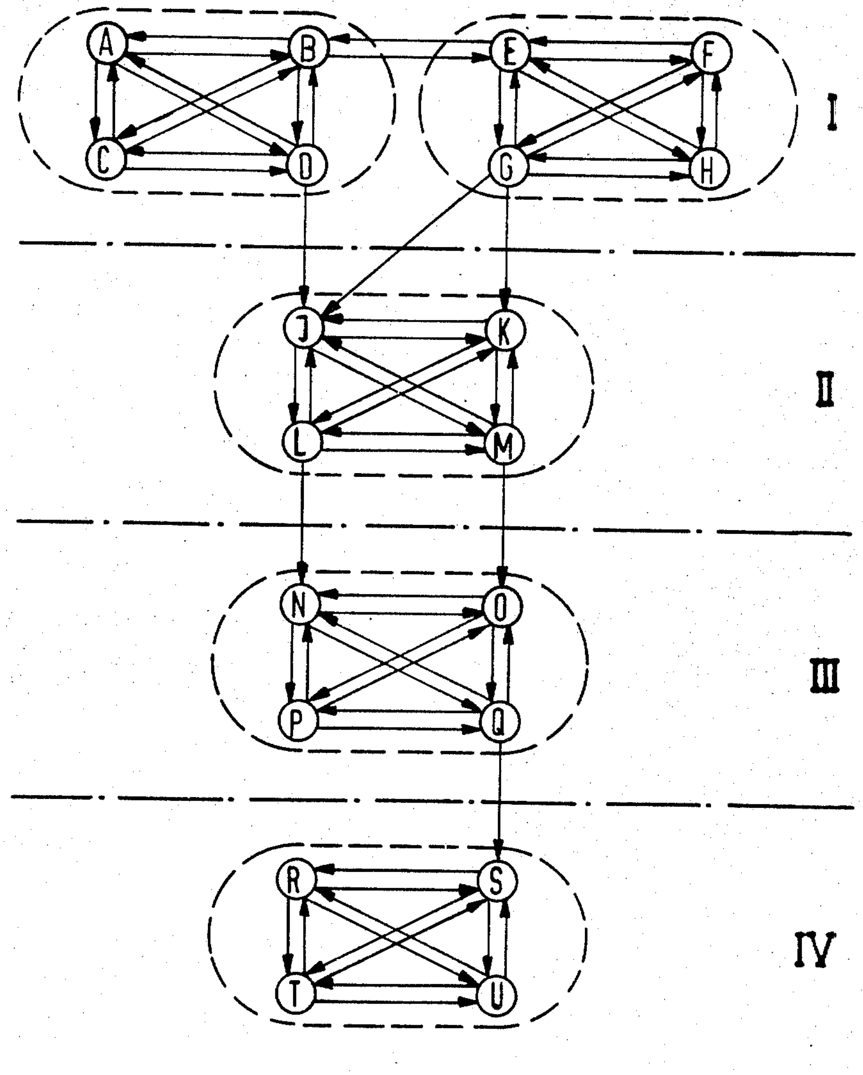
FIG. 1 schematically shows a long distance communication installation consisting of individual long distance communication network systems, each having a number of exchange stations.

The long distance communication installation shown in FIG. 1 comprises five long distance communication network systems having four exchange stations each, A – D; E – H; I – M; N – Q and R – U. A message exchange (for example, of pulse code modulated messages) is possible in the time multiplex method between the individual exchange stations of the long distance communication network system in question. The time slots or time channels which can be used are marked by pulses supplied by an oscillator pertaining to the exchange station in question, and in a given case contained therein. In order that, during a message connection between two subscriber stations connected to different exchange stations of a long distance communication network system, a time channel originally assigned to the connection in question can be retained, the oscillators pertaining to the individual exchange stations of the long distance communication network system in question are synchronized reciprocally. This is indicated in FIG. 1 by connection lines provided with appropriate arrows proceeding between the individual exchange stations.

The long distance communication network systems shown in FIG. 1 can be separate long distance communication network systems, in each case operable by themselves, with exchange stations to each of which a plurality of subscriber stations or message transmitters and message receivers is connected. In the instant case, however, the individual long distance communication network systems are to be connected with each other according to a certain hierarchy, as is already customary in at least some long distance communication network systems. In this case, subscriber stations or message transmitters and message receivers need not be connected to each exchange station. According to the mentioned hierarchy, the uppermost network system plane is a so-called central exchange office plane I, to which a main exchange office plane II is subordinated, to which in turn a junction exchange office plane III is subordinated. Finally, a final exchange office plane IV is subordinated to junction exchange office plane III. According to this hierarchy, two long distance communication network systems pertain to central exchange office plane I in accordance with FIG. 1. The main exchange office plane II, subordinated to central exchange office plane I, contains one long distance communication network system and, similarly, the junction exchange office plane III and the final exchange office plane IV also each contain one long distance communication network system.

As is further evident from FIG. 1, an oscillator pertaining to an exchange station of a long distance communication network system of central exchange office plane I is synchronized with an oscillator pertaining to an exchange station of another long distance communication network system located in the same network system plane. These two long distance communication network systems are of a type that have oscillators with approximately equal frequency fluctuation ranges. In the case of the remaining long distance communication network systems of the long distance communication installation shown in FIG. 1, synchronization occurs in each case from the direction of a long distance communication network system of the exchange office plane thereabove.

Before considering the behavior of the oscillators of the long distance communication network systems contained in the network system planes shown in FIG. 1 regarding the synchronization of the entire network system, at first a long distance communication network system of an exchange office or network system plane will be considered. With regard to such a long distance communication network system, its frequency range of forced oscillation is $f_{res} \approx (n_E/N^2) \lambda E$, wherein $n_E$ represents the range of the number of lines transmitting the synchronization pulses proceeding to the just considered long distance communication network system from another long distance communication network system; N the number of oscillators pertaining to the just considered long distance communication network system; and λ E the maximum interception or control range of the oscillators of the just considered long distance communication network system. Assume, considering the conditions shown in FIG. 1, that four oscillators (N = 4) are available in a long distance communication network system, and that to such a long distance communication network system a maximum of four lines lead from another long distance communication network system ($n_E = 1 \ldots 4$). There results as the frequency range of forced oscillation for the oscillators of the long distance communication network system in question $f_{res} = (1/16 \ldots 1/4) \cdot \lambda E$. It follows therefrom that in the present instance the frequency range of forced oscillation $f_{res}$ = 1/16 to 1/4 of the maximum interception range E of the long distance communication network system in question. In order to prevent the frequency range of forced oscillation of a long distance communication network system from being low-modulated, the oscillators contained in each case in the long distance communication network system of that network system plane which synchronize the oscillators pertaining to a long distance communication network system of the next lower network system plane are laid out in such a way that their frequency variation range in each case is smaller than the frequency range of forced oscillation of the oscillators of the long distance communication network system pertaining to the first-mentioned network system plane. This means, with regard to the example shown in FIG. 1, that the frequency variation range of the oscillators contained in the central exchange office plane I must be smaller than the frequency variation range of the oscillators contained in the subsequently-arranged main exchange office level II.

In turn, the oscillators contained in the main exchange office plane II must have a smaller frequency variation range than the oscillators present in the junction exchange office plane III, subordinated to this network system plane, which in turn must have a smaller frequency variation range than the oscillators in the final exchange office plane IV, subordinated to network system plane III. Considering the above calculated example, it follows that a stability increase is obtainable in the mean frequency of a network system plane by the factor 4 to 16 (thus, in the mean, by the factor 10) if the frequency range of forced oscillation of the oscillators contained in this network system plane is not low-modulated by the oscillators contained in each case in the network system plane thereabove.

The above explanation illustrates that the oscillators contained in the central exchange office plane I represent the oscillators having the smallest frequency variation range in the entire installation. Due to the fact that the oscillators contained in the central exchange office plane I synchronize the oscillators contained in the main exchange office plane II, subordinated to this network system plane, and that further the oscillators contained in this main exchange office plane II synchronize the oscillators contained in the junction exchange office plane III, subordinated to this network system plane, and these oscillators in turn synchronize the oscillators contained in the final exchange office plane IV, it is evident—considering the fact that the oscillators contained in the central exchange office plane I represent the oscillators with the narrowest frequency variation range in the entire network—that due to the stability of the mean frequency of the oscillators of central exchange office plane I, the mean frequency of the oscillators contained in the remaining network system planes, and thereby of the entire long distance communication network system, is also defined.

In the preceding, the synchronization of the oscillators contained in the individual network system planes according to FIG. 1 by the oscillators of the network system plane in each case thereabove was considered. However, as already mentioned above, FIG. 1 shows a further possibility according to which the oscillator of a long distance communication network system can be synchronized by an oscillator of another long distance communication network system lying in the same network system plane (retroaction). According to FIG. 1 these are oscillators pertaining to two different long distance communication network systems lying in central plane I.

Figure 2:
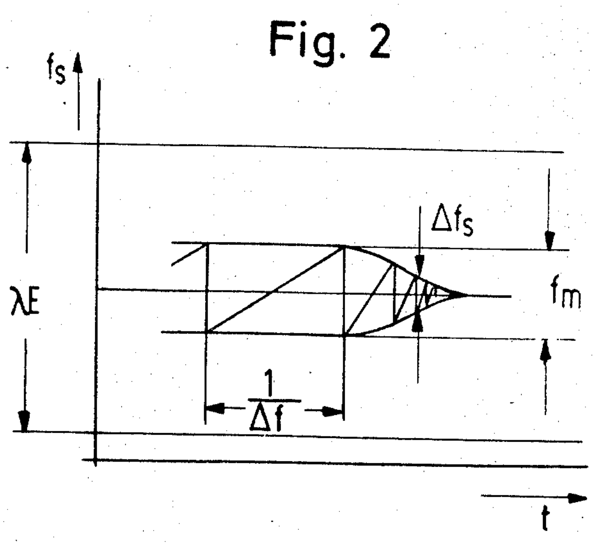
FIGS. 2 and 3 illustrate the behavior of the long distance communication network systems shown in FIG. 1 in the case of functional disturbances.
Figure 3:
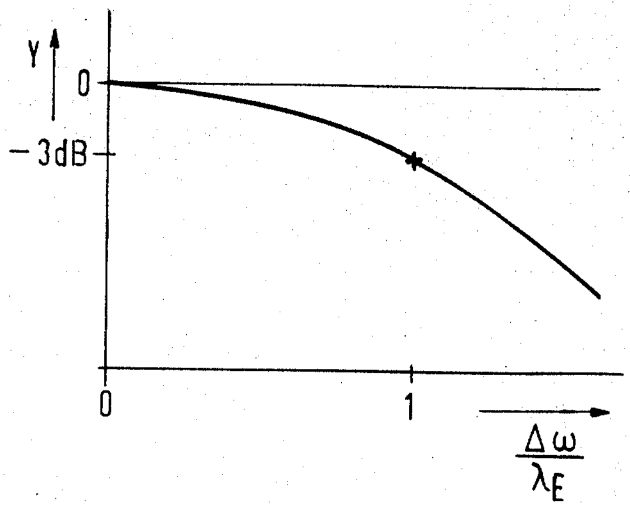

The diagrams shown in FIG. 2 and FIG. 3 show the behavior of the oscillators pertaining to the individual long distance communication network systems or the exchange stations thereof. FIG. 2 illustrates how the mean frequency $f_m$ of the oscillators pertaining to a network system plane changes with increasing deviation of the mean frequency of an oscillator synchronizing these oscillators. Thereby, if the frequency difference between the oscillators (or network system planes) is small, the amplitude of the frequency fluctuations of the synchronized oscillators is relatively large. In contrast, if the frequency difference between the oscillators of the two network system planes is large, the amplitude of the disturbances of the synchronized oscillators is relatively small. This behavior of the oscillators pertaining to the individual network system planes, and thereby the behavior of the individual network system planes themselves, is based on a low-pass-like character of the oscillators pertaining to the individual network system planes.

FIG. 3 illustrates these conditions. This diagram shows the basic course of the behavior of filter $y$ of an oscillator, related to $(\Delta\omega/\lambda E)$, wherein $\Delta\omega$ designates the difference between the circuit frequencies of two network system planes, and λ E the control range of the synchronized oscillators. Thereby the behavior of the filter $y$ is expressed by the relation: $y = 10 \log (\Delta f_s/\Delta f)^2$. In this expression, $\Delta f_s$ designates the momentary deviation from the mean oscillator frequency of the oscillators assigned to one network system plane, and $\Delta f$ the frequency difference between the mean frequency of the oscillators contained in the just mentioned network system plane and the mean frequency of the oscillators assigned to the next higher network system plane, which synchronize the first-mentioned oscillators. Due to the filter effect of the individual oscillators, or network system planes, it follows that functional disturbances occurring in a network system plane have only the effect of small disturbances on the network system plane subordinated to this network system plane compared to the operational range (control range) of this network system plane as illustrated in FIG. 3.

I claim:

1. In a plurality of long distance telecommunication systems, each system being comprised of a plurality of interconnected exchange stations with each exchange station having a plurality of subscriber stations connected thereto, the exchange stations in each said system being in communication according to either of the time or frequency multiplex principles and according to a predetermined scanning pattern with the oscillators in each said system being reciprocally synchronized, the oscillators in at least one of said systems having an approximately equal frequency fluctuation range, while the oscillators in at least one other telecommunication system having a varying fluctuation range, a method of synchronizing the oscillators in at least said two systems comprising the step of:

synchronizing an oscillator of one of said telecommunication systems by an oscillator of at least one other of said telecommunication systems, the oscillators of the latter system having a frequency fluctuation range, which is narrower than that of the oscillators of said one long distance telecommunication system.

2. A method as recited in claim 1 further comprising:

synchronizing an oscillator of at least one long distance communication network system by the oscillator of at least one other long distance communication system, the oscillators of the latter having a frequency fluctuation range $f_s$, which is narrower than the frequency range of forced oscillation $f_{res} \approx n_E/N^2 \lambda E$ of the oscillators pertaining to said at least one long distance communication network system, wherein $n_E$ designates the range in the number of connections from oscillators of the at least one other mentioned long distance communication network systems to oscillators of the at least one long distance communication network system, N the number of the oscillators pertaining to the at least one long distance communication network system, and $\lambda$ E the control range of the later oscillators.

* * * * *